July 27, 1948. E. GRONEMEYER ET AL 2,446,085
MEASURING DEVICE WITH DISTORTABLE PORTIONING MEANS
Filed March 2, 1945 2 Sheets-Sheet 1
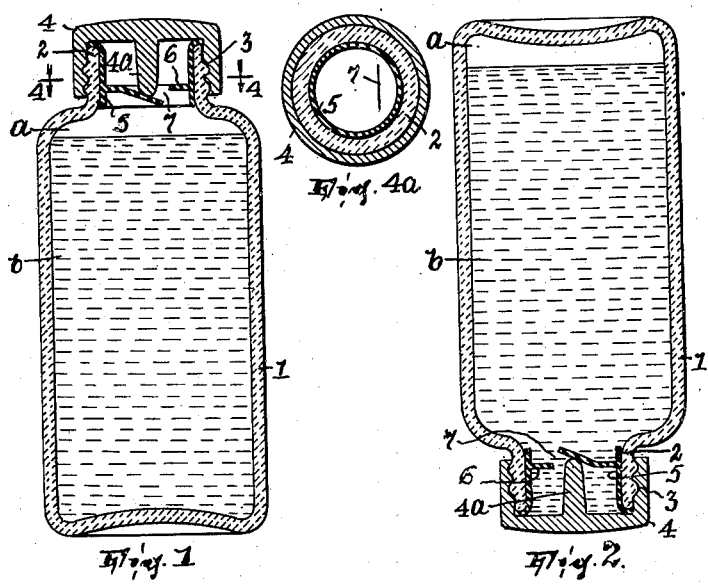
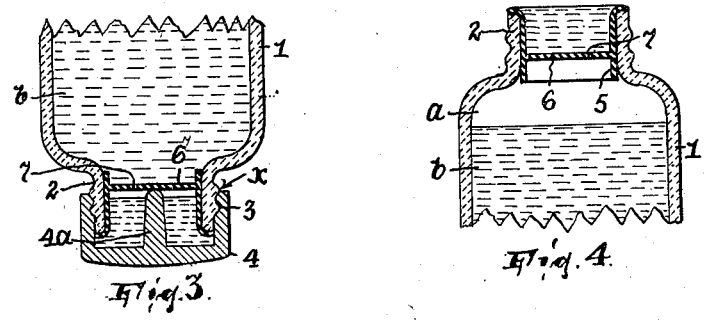
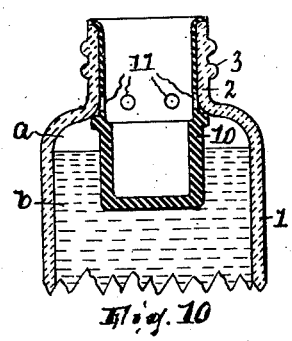
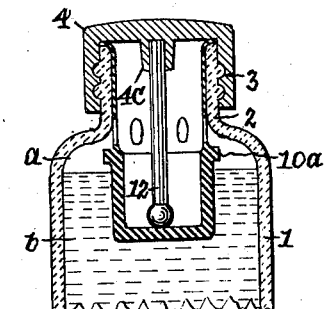
INVENTOR,
Erich Gronemeyer and
Samuel Cherba,
BY
John W. Seward
ATTORNEY July 27, 1948.  E. GRONEMEYER ET AL  2,446,085
MEASURING DEVICE WITH DISTORTABLE PORTIONING MEANS Filed March 2, 1945  2 Sheets-Sheet 2

INVENTORS,
Erich Gronemeyer and
Samuel Cherba,
BY John W. Steward
ATTORNEY.

Patented July 27, 1948

2,446,085

UNITED STATES PATENT OFFICE 2,446,085

MEASURING DEVICE WITH DISTORTABLE PORTIONING MEANS

Erich Gronemeyer, Pompton Plains, and Samuel Cherba, Totowa, N. J.

Application March 2, 1945, Serial No. 580,566

8 Claims. (Cl. 222—446)

This invention relates to a liquid-dispensing device and it has for one of its objects to provide a device of this character which on each operation thereof will at least discharge a limited quantity of its content but preferably in every instance discharge the same or a predetermined quantity, as a prescribed dose of medicine. A further object is so to construct the device that its manufacture will involve but the minimum of cost additional to that of the ordinary container (as a medicine bottle) and its cap or other closure.

Within the scope of the invention the device may take various forms, some of which are herein shown by way of example. Whereas in all such forms the container has a distortable pliable elastic closure normally sealing off flow of liquid from the space via the outlet of the container and in the closure a port which is normally closed for permitting, when opened by distorting the closure, such flow, a salient feature of our invention, is provision for delivery on each operation of not merely a limited but a predetermined quantity of the liquid.

In the drawings,

Figs. 1 to 4 show one form in vertical section in four different stages of operating the device;

Fig. 4a is a section on line 4—4, Fig. 4;

Figs. 9 and 10 are vertical sectional views of another form in which a sac also provides the closure, the stopper being omitted in Fig. 10.

Figure 5:
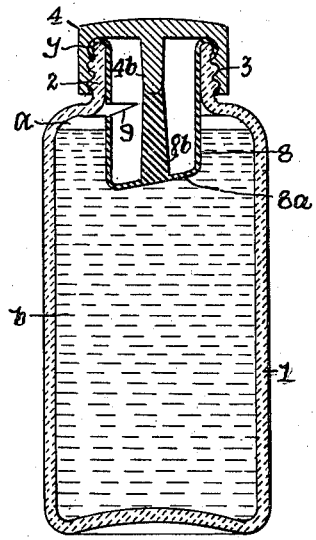
Figs. 5 to 8 are similar views of a form in which a sac provides the closure.
Figure 6:
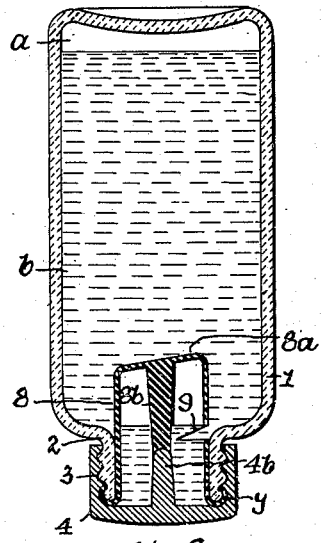
Figure 7:
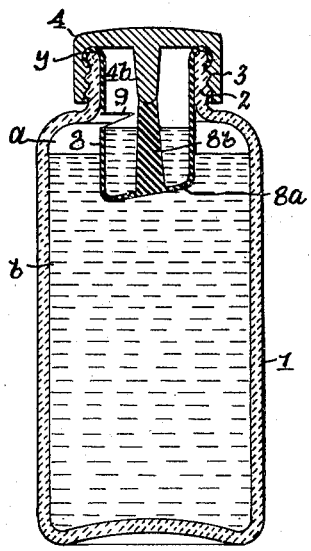
Figure 8:
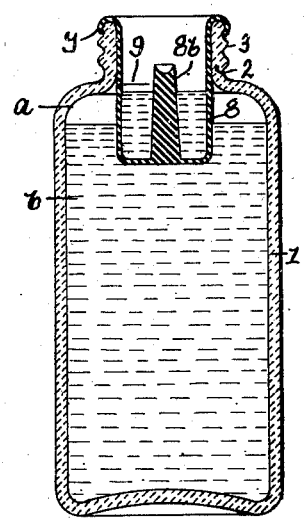

In all the forms let 1, being in the example a conventional form of bottle, be what we term the container proper from whose space $a$ containing the liquid $b$ discharge of the liquid is effected via the outlet at the upper end of what is here a reduced portion of said space formed in the neck 2 of the container proper, exteriorily threaded at 3. And let 4 be a stopper here in the form of a cap interiorly threaded for engagement with the threading of the neck and when screwed down on the neck adapted in some way, as will appear, to coact with what we term the container, embodying such container proper and a closure, to initiate an operation in which at least but a limited, but preferably a predetermined, quantity of liquid may be discharged as a consequence of each complete operation of the device.

Referring, first, to Figs. 1 to 4a: In the container proper, to wit, in the passage of its neck formed by said reduced portion, is a pliable elastic closure, as of rubber or other plastic, normally sealing off flow of liquid from said space $a$ via the outlet. It here takes the form of a tube 5 having its bore divided by a transverse wall or partition 6, the tube being formed to fit the neck passage as snugly as possible. The wall 6 is provided with a port in the form of a breach 7 which, in the relaxed or normal state of the wall portion of the closure, exists normally closed.

The stopper is provided with a downwardly extending axial projection 4a with respect to which the mentioned port is offset and which projection, when the stopper is screwed down to its limit shown by Figs. 1 and 2, distorts the wall portion of the closure from its normal state thus to open the port as shown in those figures. In Fig. 1 the device is upright, with the stopper fully depressed and at least substantially completely sealing off the outlet, its projection holding wall 6 distorted and hence the port open. In Fig. 2 the device is inverted to permit flow of the liquid via the port. In Fig. 3, the device still inverted, the stopper has been sufficiently retracted thus to permit the port to close and leave the liquid that escaped via the port entrapped between said wall and the stopper. In Fig. 4 the device has been returned to upright position and the stopper removed preparatory to discharge of the liquid above said wall upon again inverting the container. Thus at least a limited quantity of liquid may be delivered on each operation involving the steps illustrated by Figs. 2 to 4. If a predetermined or measured quantity of liquid is to be delivered on each operation, assuming the container proper to be of transparent material, as glass, the operator in the position of Fig. 3 can visually observe when the port is closed before retracting the stopper so far while the container still remains inverted that leakage might then ensue to reduce the otherwise measured quantity. Or there may be a mark, as at the arrow $x$, on the exterior of the neck which, at once when uncovered by the stopper, would indicate such closing of the port. It is of course assumed that at least in the case where a predetermined or measured quantity is to be discharged the fit between the exterior of the neck and the stopper should continue to provide an hermetic seal until preferably, as in Fig. 4, the device has been returned to upright position.

Figs. 5 to 8: In this case a predetermined or measured quantity of liquid is on each operation automatically determined. The container here comprises, with the container proper 1, a closure in the form of a pliable elastic sac 8, as of rubber or other plastic, which is to form the closure, the same preferably fitting the passage of the neck and having its mouth or open end open in the same direction as the outlet and its opposite or bottom end portion flanked laterally by the space of the container. To provide the port the sac has a breach at 9 in the form of a slit in the side of said end portion in position to open to said space, being located a predetermined distance from the bottom or end wall 8a of the sac and being normally closed in the same sense as the port 7 of Figs. 1 to 4, to wit, in the normal or relaxed state of the sac shown by Fig. 8. In this case the stopper 4 and the sac have coacting axial projections, as 4b and 8b, respectively, adapted to abut each other in the closed state of the stopper (Figs. 5 to 7), one preferably having its end convex to engage in a concavity of the end of the other and insure maintenance of their coactive relation. In the upright or usual position of the stopper (Fig. 5) it is screwed down to its closing limit, whereby the projections coact to distort, by elongating, the sac, thus maintaining the port open. For discharge of a predetermined quantity of the liquid the device is inverted, Fig. 6, while the port remains open, wherefore liquid enters the sac until its level approximates the then uppermost reach of the port, air being entrapped in the sac above such level. While the port still remains open the device is returned to upright position so that all liquid therein above a level coincident with the then lowest reach of said port drains back into the space a, Fig. 7. The stopper being now removed, so that the port is permitted to close, Fig. 8, the automatically measured quantity of liquid, i. e., being what is left in the sac as in Fig. 7, may be poured off.

Figs. 9 and 10: The container proper 1 and the stopper 4 (excepting for a modification of the latter to be referred to) are the same as before described. The sac 10 of the container and forming the closure is the same in form as the sac 8 in the respects that it preferably fits as closely as possible the passage of the neck of the container proper, has its mouth open in the same direction as the outlet and its opposite or bottom end portion flanked by the space a of the container. But in its portion which is within the neck it has one or more ports 11 which exist in the sac formed as actual openings but which are nevertheless normally closed off from the space a in some way other than has been hereinbefore explained, as hereby the surrounding portion of the neck, assumed quite snugly to embrace the sac. In this example the projection for the stopper takes the form of a rod 12 of glass or other stiff material fixed in a central socket 4c of the stopper and having sufficient length to elongate the sac, as will appear, when the stopper is in fully closed position, the object of which is to avoid the difficulties attendant on molding the stopper with an integral projection. An exterior continuous shoulder 10a is formed on the sac immediately below the neck and may act alone or cooperate with the neck to maintain the port or ports 11 normally closed, to wit, by continuously abutting the inner surface of the container where space a merges into the passage of the neck. The steps of the operation in this form are substantially the same as in the forms shown by Figs. 5 to 8. In Fig. 9 the stopper is in closed position, holding the sac elongated so that the shoulder 10a is retracted from contact with the surrounding part of the container proper and the ports are displaced downwardly sufficiently to be exposed to space a. On inverting the device the liquid occupies the sac to the then uppermost reach of the ports. On returning the device to upright position drainage of the liquid in the sac proceeds until the level thereof attains the now lowest reach of the parts. The stopper being now removed the sac assumes its normal or relaxed state, the ports becoming closed. The stopper may now be removed to pour off the liquid left in the sac.

In Figs. 5, 6, 7, and 8, as at y, the tubular portion of the closure preferably has its upper or mouth margin continuously thereof bent outwardly over the edge or rim of the container proper around its outlet and then downwardly not only to support the closure against downward displacement but to form between the stopper and container proper a doubly effective seal, to wit, both because, when the stopper is at its lowest limit, it will then thrustwise exert pressure on said margin and also constrict its downwardly extending exterior portion. Dependence on the tubular portion of the closure to form a seal with the interior of the neck of the container proper is not reliable when the latter is formed of glass and hence the neck passage may be irregularly formed.

As indicated hereinbefore, the means for distorting the closure, as 4—4a in Figs. 1 to 4, 4—4b—8b in Figs. 5 to 8, or 4—4c—12 in Figs. 9 and 10, need not necessarily include a cap for closing the container outlet but any form of closure.

The term "breach" wherever used herein is to be construed as what, when open, permits flow through the closure. In the examples herein set forth it takes the form of a port or a plurality of ports.

What in some of the appended claims we term a "valve" may be taken as the portion of wall 6 in Fig. 4 which is immediately to the left of the breach 7; as the portion of the sac immediately below the breach 9 in Fig. 5; or the shoulder 10a in Fig. 9.

Having thus fully described our invention, what we claim is:

1. A liquid dispensing device including in combination, with a container having a space therein, a liquid-discharge outlet communicating with said space, and a pliable elastic closure normally sealing off flow of liquid from the space via the outlet, said container having in the closure a normally closed port arranged to permit, when opened, flow of liquid from said space toward the outlet, of a stopper for the outlet removably connected with the container and movable thereon toward and from the closure and respectively into and out of closing relation to the outlet, one of the group of parts consisting of the stopper and the closure having a projection arranged to abut the other such part and thereby to distort the closure to open said port when the stopper is moved toward the closure.

2. A liquid-dispensing device including in combination, with a container having a space therein, a liquid-discharge outlet communicating with said space, and a pliable elastic closure normally sealing off flow of liquid from the space via the outlet, said closure having a normally closed breach arranged to permit when opened, flow from said space toward the outlet, of a stopper for the outlet removably connected with the container and movable thereon toward and from the closure and respectively into and out of closing relation to the outlet, one of the group of parts consisting of the stopper and the portion of the closure which is beyond the breach relatively to the outlet having a projection arranged to abut the outer such part, and thereby to distort the closure to open said breach when the stopper is moved toward the closure.

3. A liquid-dispensing device including, in combination, with a container having a space therein, a liquid discharge outlet communicating with said space, and a pliable elastic sac forming a closure normally sealing off flow of liquid from the space and via the outlet of the container and having its mouth open toward the outlet, said sac having a normally closed breach arranged to permit, when opened, flow from said space toward the outlet, of a stopper for the outlet removably connected with the container and movable thereon toward and from the other end of the sac, and respectively into and out of closing relation to the outlet, one of the group of parts consisting of the stopper and the portion of the sac which is beyond the breach relatively to the outlet having a projection arranged to abut the other such part, and thereby to distort the sac to open the breach when the stopper is moved toward said other end of the sac.

4. A liquid-dispensing device including, in combination, with a container proper having a space therein, a liquid-discharge outlet communicating with the space and a pliable elastic sac in said container proper normally sealing off flow of liquid from the space via the outlet of the container proper and having its mouth end open toward the outlet and also having removed from its mouth end, a port, to permit such flow normally sealed off from said space by said container proper, of a stopper for the outlet removably connected with the container proper and movable on the latter toward and from the other end of the sac, respectively into and out of closing relation to the outlet, one of the group of parts consisting of the stopper and the portion of the sac beyond the port relatively to the outlet having a projection arranged to abut the other such part and thereby to elongate the sac to the state in which said aperture is exposed to said space.

5. The combination of a liquid container proper having a space therein and a liquid-discharge outlet communicating with the space, the container being formed around said outlet with an edge, a tubular elastic pliable closure in the container proper having an open end open toward said outlet and its marginal portion at said end bent outwardly over said edge and then continued downward, said closure having a port to permit flow of liquid from the space of the container toward said outlet, said port being normally closed but arranged to be opened on distortion of the closure by pressure exerted thereon in a direction from the outlet, and a stopper for the outlet removable from the container proper and movable thereon toward the closure into abutting and constricting relation to said marginal portion of the closure, one of the parts of the group consisting of the stopper and closure having a projection arranged to abut the other such part and thereby to distort the closure to open said port when the stopper is moved toward the closure.

6. A liquid-dispensing device including with a container having a space therein and having a discharge passage communicating with such space, the discharge passage having an outlet at its outer end, the container including a pliable elastic closure spaced from the outlet in a direction inwardly of the container, said closure normally closing off liquid flow via the outlet, said container having a normally closed port openable by the closure by distortion of the latter, a stopper adapted for application to the discharge outlet of the container by movement toward the closure, and means interposed between the stopper and closure to initiate distortion of the closure to open said port during such movement of the stopper.

7. The device set forth in claim 6 characterized by said closure being in the form of a sac having its mouth open toward said outlet and by said port being between the closed end of the sac and said outlet.

8. A liquid-dispensing device including a container having a liquid-receiving space, a discharge outlet from said space above the liquid-level therein, and a sac-shaped closure depending into said space and having its mouth open to the outlet and said closure normally partitioning off the outlet-adjoining portion from the remaining portion of said space, said closure having a normally closed breach arranged above its lower end and, when said breach is open, to permit flow from said remaining portion of said space to said outlet-adjoining portion of said space, said closure being distortable to open the breach, in combination with means movable to distort said closure to open the breach and during the movement of said means to seal the outlet.

ERICH GRONEMEYER.
SAMUEL CHERBA.

REFERENCES CITED

The following references are of record in the file of this patent:

UNITED STATES PATENTS

| Number | Name | Date |
|---|---|---|
| 1,283,050 | Berg | Oct. 29, 1918 |
| 1,930,040 | Crowley | Oct. 10, 1933 |
| 2,069,103 | Engle | Jan. 26, 1937 |
| 2,095,622 | Wilson | Oct. 12, 1937 |
| 2,376,123 | Cohen | May 15, 1945 |